United States Patent [19]
Hua et al.

[11] Patent Number: 5,262,930
[45] Date of Patent: Nov. 16, 1993

[54] ZERO-VOLTAGE TRANSITION PWM CONVERTERS

[75] Inventors: Guichao C. Hua; Fred C. Lee, both of Blacksburg, Va.

[73] Assignee: The Center for Innovative Technology, Herndon, Va.

[21] Appl. No.: 897,674

[22] Filed: Jun. 12, 1992

[51] Int. Cl.$^5$ .......................................... H02M 3/335
[52] U.S. Cl. ..................... 363/21; 323/222; 323/282
[58] Field of Search .................. 363/16, 20, 21; 323/222, 224, 282, 351

[56] References Cited

U.S. PATENT DOCUMENTS

| | | | |
|---|---|---|---|
| 4,785,387 | 11/1988 | Lee et al. | 363/21 |
| 4,811,188 | 3/1989 | Bees | 363/28 |
| 5,066,900 | 11/1991 | Bassett | 323/224 |
| 5,172,309 | 12/1992 | De Doncker et al. | 363/132 |

OTHER PUBLICATIONS

"Zero-voltage switching technique in dc-dc converters," Liu and Lee; IEEE Power Electronics Specialists Conf. Rec., pp. 58-70, 1986.

"Zero-voltage-switched quasi-resonant buck and flyback converter-experimental results at 10 MHz," Tabisz et al.; IEEE Trans. on Power Electronics, vol. 4, No. 2, pp. 194-204, Apr. 1989.

"Zero-voltage-switching technique in high-frequency off-line converters," Jovanovic et al.; IEEE Applied Power Electronics Conf. Proc., pp. 23-32, 1988.

"Zero-voltage-switching multi-resonant technique—a novel approach to improve performance of high-frequency quasi-resonant converters," Tabisz et al.; IEEE Power Electronics Specialists Conf. Rec., pp. 9-17, 1988.

"Design considerations for high-power full-bridge ZVS-PWM converter," Sabate et al.; IEEE Applied Power Electronics Conf. Proc., pp. 275-284, 1990.

"Designing a high frequency FET inverter module for vector summation switching high power amplifier," Fang et al.; POWERCON 11, 1984.

"An improved zero-voltage-switched resonant-transition PWM converter using a saturable inductor," Hua et al.; IEEE Power Electronics Specialists Conf. Rec., 1991.

"Quasi-square-wave converters: topologies and analysis," Vorperian; IEEE Transactions on Power Electronics, vol. 3, No. 2, Apr. 1988, pp. 183-191.

"A new class of ZVS-PWM converters," Hua et al.; High Frequency Power Conversion Conf., 1991.

*Primary Examiner*—Steven L. Stephan
*Assistant Examiner*—Ben M. Davidson
*Attorney, Agent, or Firm*—Whitham & Marhoefer

[57] ABSTRACT

A pulse-width-modulated, quasi-resonant, d.c. to d.c. converter that has an auxiliary switch that periodically kills the resonance.

3 Claims, 8 Drawing Sheets

(a)buck, (b)boost, (c)buck-boost,
(e)Sepic, (f)Zeta, (g)forward, (h)flyback

ZERO-VOLTAGE TRANSITION PWM CONVERTERS

BACKGROUND OF THE INVENTION

1. Field of the Invention

The present invention is generally related to pulse-width-modulated converters, and more particularly to two new classes of pulse-width-modulated converters that provide constant frequency operation, low-switching losses, and low-component stress; one class is a novel-zero-voltage transition converter and the other is a novel zero-voltage-switching converter.

2. Description of the Prior Art

Those skilled in the art have recognized the benefits and desirability of operating pulse-width-modulated converters at high frequency, particularly, direct current to direct current converters. Basically, high-frequency operation is desirable as it allows a size and weight reduction of the converter for a given power. However, switching losses, component stresses, and noise due to parasitic oscillations are inherent problems with pulse-width-modulation technology, and these problems have limited, as a practical matter, the operating frequency of pulse-width-modulated converters. Zero-voltage-switching, quasi-resonant converter technology can eliminate much of the switching losses and parasitic oscillations associated with the power switches in a converter. However, prior art zero-voltage-switching, quasi-resonant technology have additional limitations in that they produce a high voltage stress in certain components, have a limited range of loads with which they can operate, and produce a variable switching frequency. For example, in a zero-voltage-switching, quasi-resonant converter (ZVS-QRC) the power switch in a single-ended ZVS-QRC suffers from excessive voltage stress proportional to the load range. Using the buck ZVS-QRC as an example, for a 10% to 100% load range, the peak voltage stress of the power switch can be 11 times the input voltage. Therefore, high voltage MOSFET(s) accompanied with high on-resistance and large input capacitance have to be used, increasing the conduction loss and the gate driver loss. In addition, a wide switching frequency range is required for a ZVS-QRC to operate with a wide input voltage and load range. The wide frequency range makes optimization of the power transformer, input/output filters, control circuit, and power switch drive circuit difficult. For example, to decrease conduction loss, power MOSFETs with low on-resistances are preferred. However, MOSFETs with low on-resistance are accompanied by large input capacitances, which can cause significant driver loss at high-frequency operation, especially at high line and light load.

SUMMARY OF THE INVENTION

An object of this invention is the provision of a dc-dc pulse-width-modulator converter for high-frequency operation with low switching losses, low stress, low noise, and constant frequency operation.

Briefly, this invention contemplates the provision of a pulse-width-modulated, quasi-resonant, d.c. to d.c. converter that has an auxiliary switch that periodically kills the resonance.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
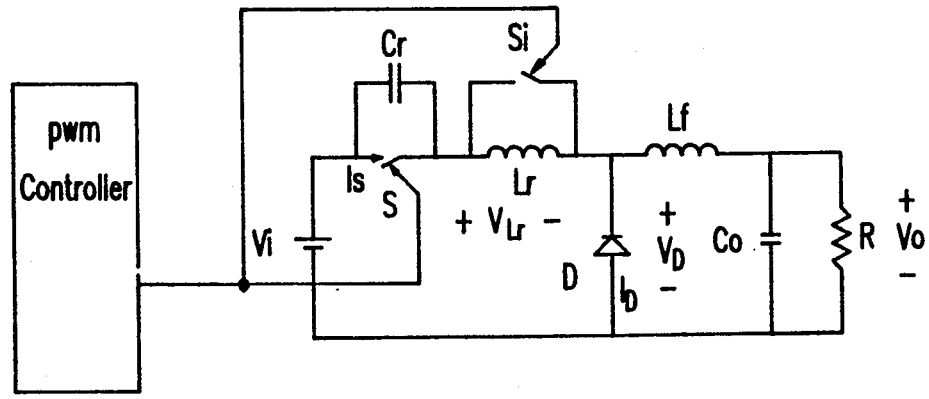
FIG. 1 is a schematic diagram of one embodiment of a buck zero-voltage-switching pulse-width-modulated converter in accordance with the teachings of this invention along with its key waveforms.
Figure 1:
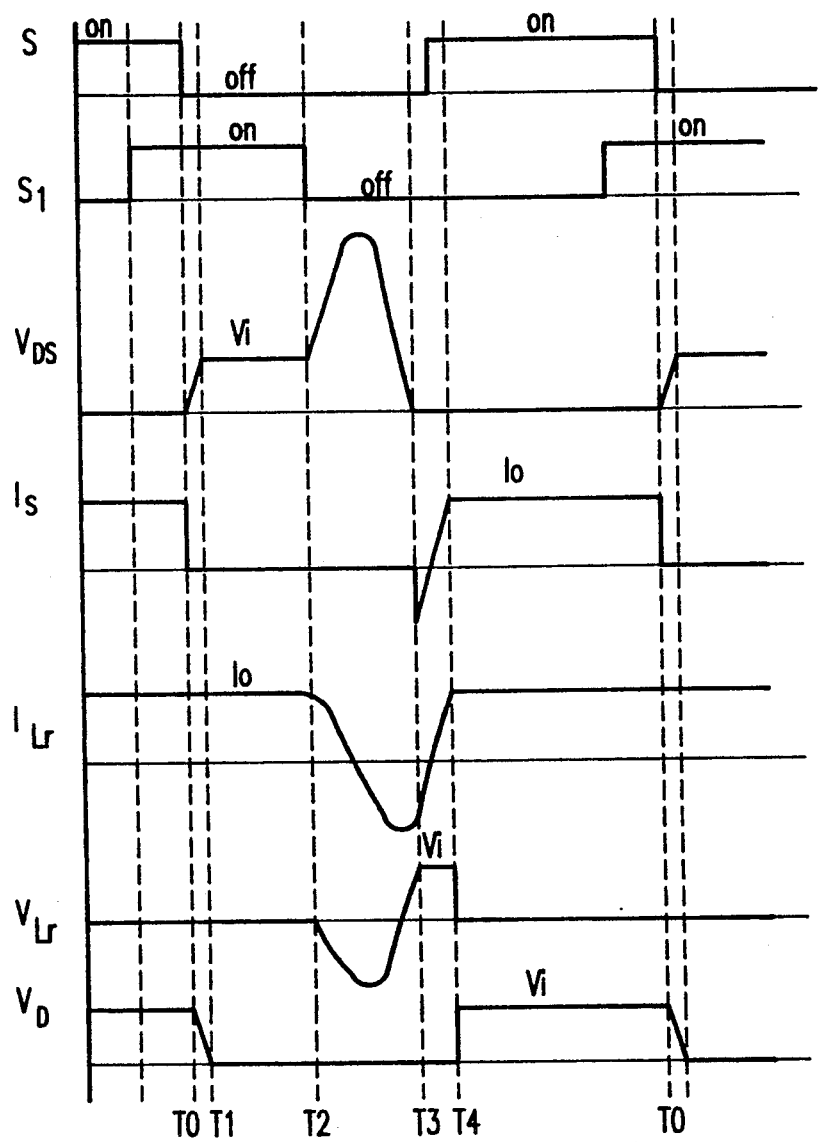

Referring now to the drawings, and more particularly to FIG. 1, it shows a buck converter comprised of a voltage source Vi, Switch, diode D, inductor Lr, capacitor $C_o$, load resistor R and resonant circuit comprised of inductor Lr and capacitor Cr. This new circuit differs from a buck ZVS-QRC by using an auxiliary switch S1 in parallel with the resonant inductor. The output filter inductor Lr is considered as a current source in the following analysis.

Figure 2:
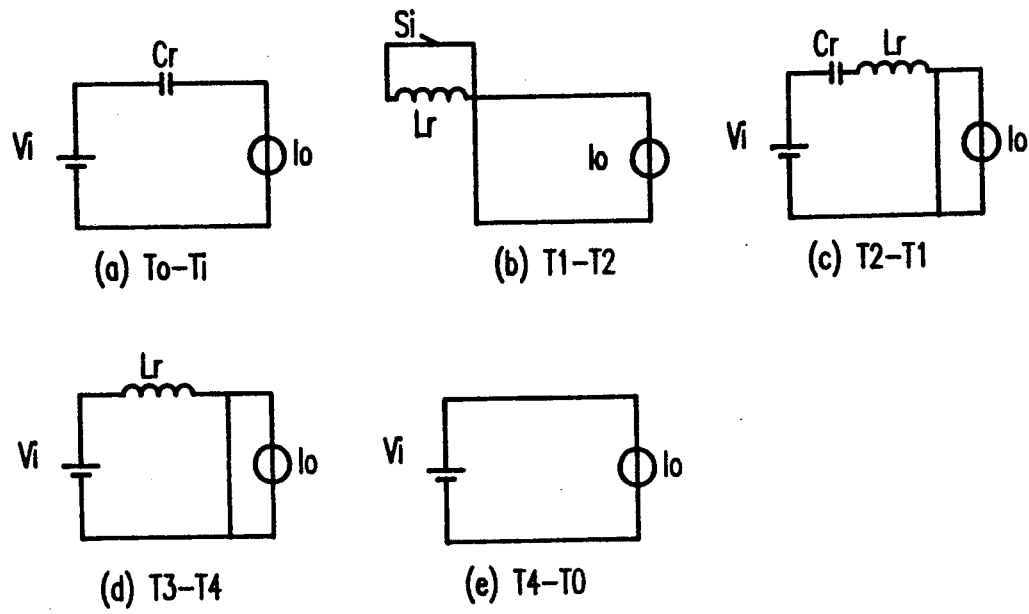
FIGS. 2a through 2e illustrate the equivalent circuit for the circuit shown in FIG. 1 at five operational stages.

As shown in FIG. 2, five topological stages exist within one switching cycle:

(1) $T_o$–$T_1$: The active switch S is turned off at $T_o$. The freewheeling diode D is off, and the resonant inductor current remains at Io value during this interval. The resonant capacitor (Cr) is charged linearly until its voltage reaches the input voltage. The equivalent circuit of this topological stage is shown in FIG. 2(a).

(2) $T_1$–$T_2$: At time $T_1$, D is turned on, starting the freewheeling interval. The Lr current constant by circulating through the auxiliary switch S1. Therefore, the energy stored in the resonant inductor (which is used to achieve ZVS for switch S) stays unchanged.

(3) $T_2$–$T_3$: At time $T_2$, S1 is turned off, and the resonance between Lr and Cr begins. This interval lasts until $T_3$ when the voltage applied to switch S (or Cr) is forced to zero, and the anti-parallel diode of switch S is turned on.

(4) $T_3$-$T_4$: Switch S is turned on with ZVS during this time interval. The Lr current increases linearly while the diode D current decreases. At $T_4$, diode D is turned off with ZCS.

(5) $T_4$-$T_o$: S1 is turned on with ZVS before switch S is turned off. This interval lasts until $T_o$, when switch S is turned off, and the cycle is repeated.

Compared to a buck ZVS-QRC, the converter shown in FIG. 1 possesses an extra freewheeling stage ($T_1$-$T_2$), during which the resonant inductor current flows through S1 and remains constant. Constant-frequency operation is achieved by controlling this freewheeling time interval ($T_1$-$T_2$). Furthermore, the resonant interval ($T_2$-$T_3$) can be relatively short with respect to the switching period. This feature makes operation of the proposed circuit resemble that of the conventional PWM converter for most portions of the cycle.

The circuit design strategy for the buck ZVS-PWM converter shown in FIG. 1 is different from that of a prior art buck ZVS-QRC. To limit the switch voltage stress, the circuit can be designed to begin to lose zero-voltage-switching property at about half load. Thus the maximum voltage stress of the active switch approximately triples the input voltage at full load. At light load, ZVS is partially lost. This does not cause a thermal problem since the conduction loss is low at light load. Furthermore, due to the low switching current and the constant frequency operation, this switching loss is not significant. At very light load, the operation of the proposed circuit is similar to that of a conventional PWM buck converter.

When the resonant frequency of the buck ZVS-PWM converter is designed to be much higher than the switching frequency, the parasitic ringing across the rectifier becomes less pronounced. The high frequency ringing can be easily suppressed. In addition, due to the constant frequency operation, snubber loss is constant with changes in load current.

The power switch S in a single-ended ZVS-QRC such as shown in FIG. 1 experiences high voltage stress proportional to the load range.

The voltage applied to the active switch or the resonant capacitor reaches its maximum value as the resonant inductor reaches zero current, that is, when the inductor energy is completely transferred to the resonant capacitor. Thus, this maximum voltage stress is essentially determined by the energy stored in the resonant inductor, which is proportional to the square of the inductor current or the load current.

Figure 3:
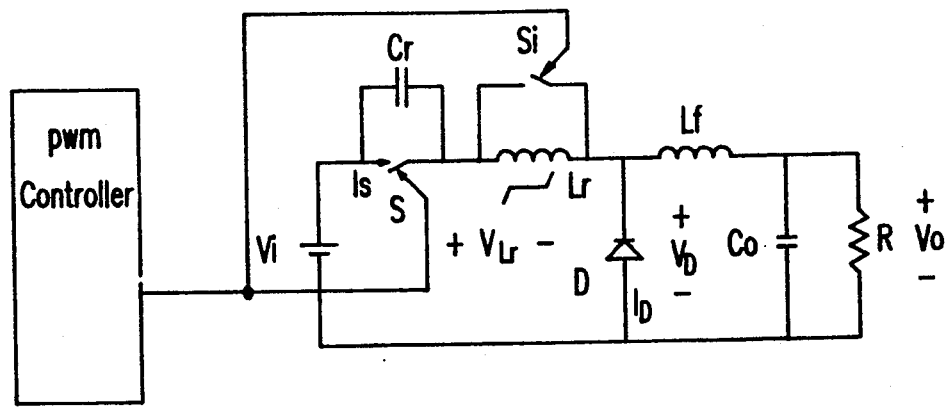
FIG. 3 is a schematic diagram of another embodiment of a buck zero-voltage-switching pulse-width-modulated converter in accordance with the teachings of this invention.
Figure 3:
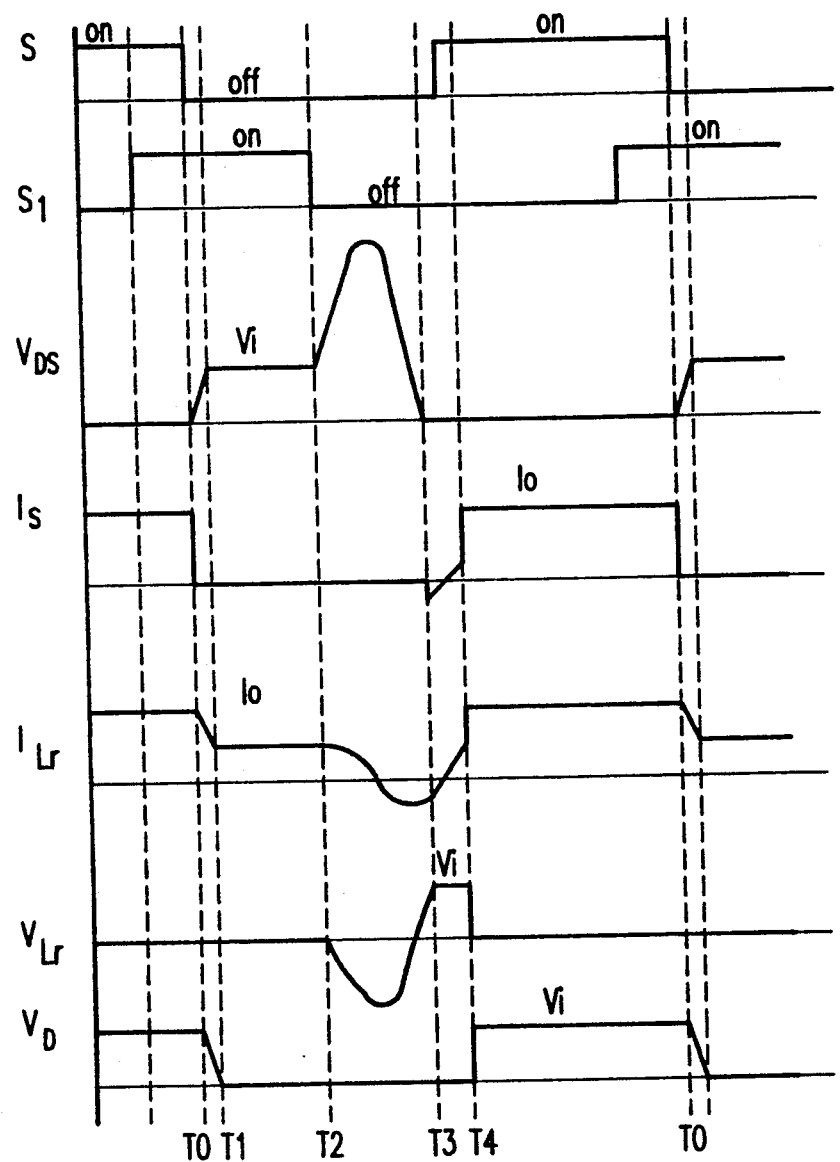
Figure 3A:
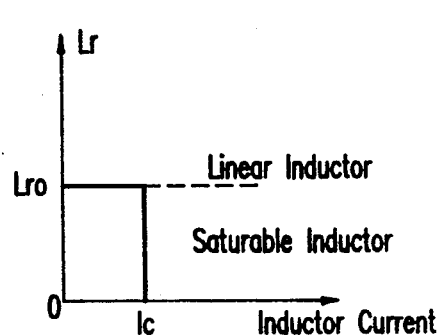
FIGS. 3a and 3b show respectively certain characteristics of a saturable inductor and a linear inductor.
Figure 3B:
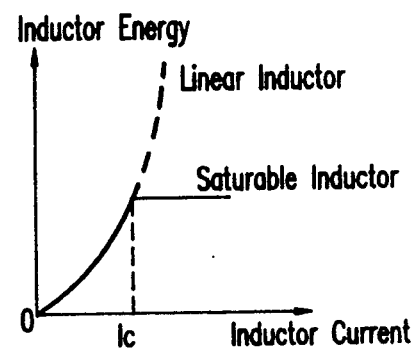

The inductance vs. current curve of an ideal saturable inductor is shown in FIG. 3(a). When the inductor current exceeds the critical saturation current, Ic, its inductance becomes zero. The maximum energy stored in the saturable inductor is limited. FIG. 3(b) shows the energy vs. current characteristics of a saturable inductor. If a saturable inductor is used in a ZVS-QRC, the maximum switch voltage stress will be limited by the saturation inductor energy. When a saturable inductor is employed, a ZVS-QRC can achieve a wider ZVS load range without significantly increasing the voltage stress of the power switch.

If the linear inductor Lr is replaced by a saturable inductor in the buck ZVS-PWM converter in FIG. 1, the circuit can achieve a wider load range without increasing the voltage stress on the power source due to the limit of the energy stored in the saturable inductor.

FIG. 3 is a circuit diagram and key waveform diagram of the buck ZVS-PWM converter of FIG. 1 employing a saturable inductor Lr. The operation of this circuit is slightly different from the previous circuit during time $T_o$ to $T_4$.

When switch S is turned off at $T_o$, the inductor current decreases very quickly, until the inductor gets out of saturation. The inductor energy remains unchanged until $T_2$, where switch S1 is turned off, and the inductor Lr starts to resonate with the capacitor $C_r$. When the resonant inductor reaches zero current (where its energy is completely transferred to $C_r$), the power switch reaches its maximum voltage $V_{DS}^{Max}$.

To ensure the zero-voltage turn-on of the power switch at $T_3$, the inductor energy has to be large enough to discharge $C_r$ to zero voltage, i.e.

$$\tfrac{1}{2}L_{ro}I_c^2 \geq \tfrac{1}{2}C_r V_i^2.$$

Since the energy stored in the saturable inductor is constant, the maximum voltage stress of the power switch is load independent. Therefore, a wider ZVS load range can be achieved without increasing the voltage stress of the power switch. Theoretically, if the inductor is designed to have a critical current ($I_c$) equal to one fifth of the maximum load current, the converter will operate with 20% load to full load ZVS range, while keeping the peak voltage stress as low as twice the input voltage.

During the interval $T_3$-$T_4$, the inductor current increases linearly until it reaches $I_c$ at $T_4$, when the inductor saturates, and its current rises abruptly to $I_o$. Meanwhile, the voltage across the diode also rises abruptly to Vi, causing parasitic ringing between the diode junction capacitance and the resonant inductor. With a saturable inductor, this parasitic ringing is less severe, since the inductance is drastically reduced after the core is saturated. Another benefit of using a saturable inductor is the reduced conduction loss in S1. Due to the low conduction current ($I_c$) during the freewheeling time ($T_1$-$T_2$) when S1 is on, a small auxiliary switch can be used as S1.

Figure 4:
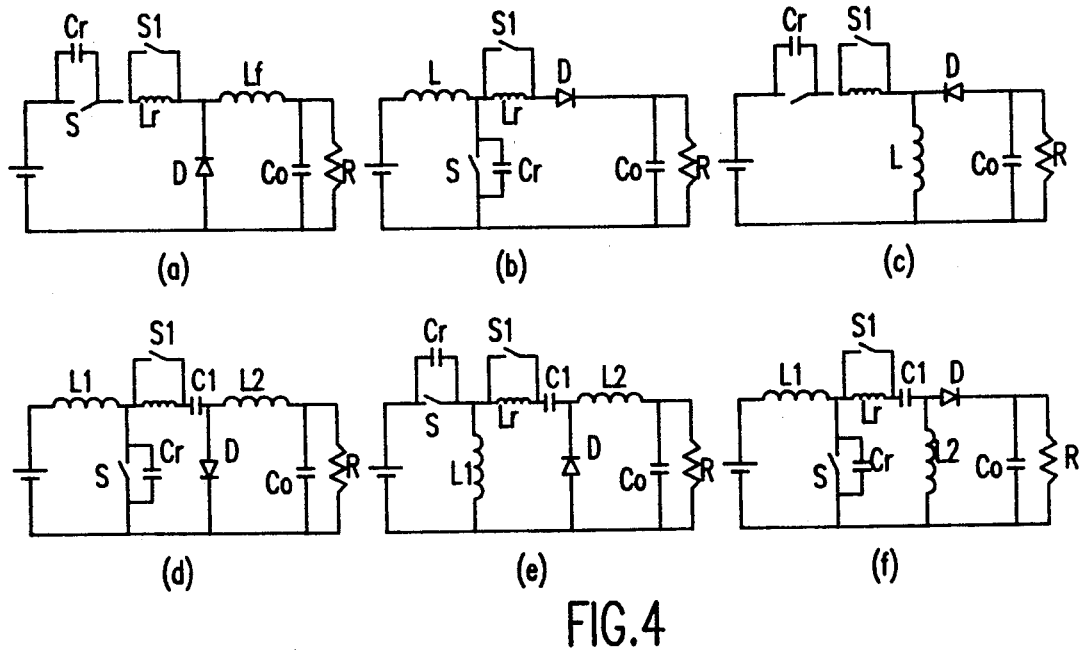
FIGS. 4a through 4f show six topologies of zero-voltage-switching pulse-width-modulated converters in accordance with the teachings of this invention.

Simply by adding an auxiliary switch across the resonant inductor in a ZVS-QRC, a new family of ZVS-PWM converters can be derived. Six basic topologies of the ZVS-PWM converters are shown in FIG. 4. FIG. 4a shows a buck convert, 4b shows a boost converter, 4c shows a buck-boost converter, 4d shows a Cuk converter, 4e shows a Sepic converter and 4f shows a Zeta converter. The new concept can be applied to any non-isolated or isolated ZVS-QRC. Besides, the resonant inductor in each new converter can be replaced by a saturable inductor to reduce circulating energy and extend the ZVS load range.

Figure 5:
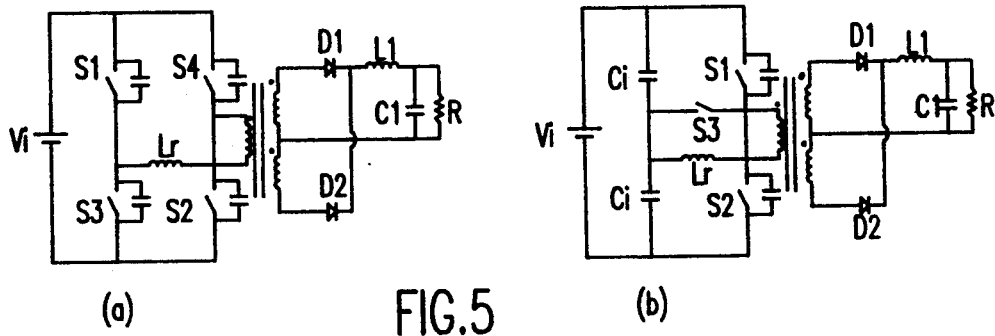
FIGS. 5a and 5b show respectively a full-bridge and a half-bridge zero-voltage-switching pulse-width-modulator in accordance with the teachings of this invention.

Two interesting isolated topologies of ZVS-PWM converters are the half-bridge (HB) and full-bridge (FB) ZVS-PWM converters, as shown in FIGS. 5a and 5b, respectively. They are particularly useful for practical applications since the maximum voltage stress of the power switches in both converters are clamped to the input voltage. The configuration of the well-known FB-ZVS-PWM converter fully resembles the FB-ZVS-QRC. However, its operation differs from the latter by applying phase-shift control, which essentially creates an extra freewheeling operation stage during which the resonant inductor current circulates through the upper or lower two switches. During the freewheeling time, the voltage across the transformer primary or secondary is zero, the resonant inductor current keeps constant by flowing through the upper or lower switches; thus the equivalent circuit of this operation stage is identical to that with an auxiliary switch cross the resonant inductor. Consequently, no auxiliary switch is needed in this particular topology. As discussed, the incorporation of a saturable inductor to this converter can result in significant improvement in performance.

The HB-ZVS-PWM converter combines the merits of the conventional HB-PWM converter and the HB-ZVS-QRC. The use of the auxiliary switch introduces an additional freewheeling stage within the operation of the FB-ZVS-QRC. Constant-frequency operation is achieved by controlling this freewheeling time interval. Since the transformer leakage and the output capacitances of the MOSFETs are utilized to achieve ZVS, switching losses are significantly reduced at a limited increase of conduction loss. The auxiliary switch S3 also operates with ZVS and is subjected to a voltage stress of half input voltage. It can be implemented by either two anti-paralleled MOSFETs or a bridge-type switch consisting of one MOSFET and four diodes. The HB-ZVS-PWM converter can be well used for low-to-mid power conversion applications.

Employing an auxiliary switch across the resonant inductor of a ZVS-QRC, creates a freewheeling stage within the quasi-resonant operation. The advantages of this additional free-wheeling stage are two-fold. Firstly, it enables constant frequency operation by controlling the time interval of this freewheeling stage. Secondly, the freewheeling stage can occupy a substantial portion of a cycle so that the proposed circuit resembles that of a conventional PWM converter. Resonant operation takes place only during a small portion of a cycle and is used only to create a ZVS condition for the power switch. In this way, the circulating energy required for ZVS-QRC operation can be significantly reduced. To further enhance the circuit capability of handling a wide load range, a saturable inductor is employed to replace the linear resonant inductor. A 10:1 load range can be obtained while maintaining ZVS for the power switch without significantly increasing its voltage stress.

The proposed technique can be implemented in any non-isolated or isolated ZVS-QRC.

Figure 7:
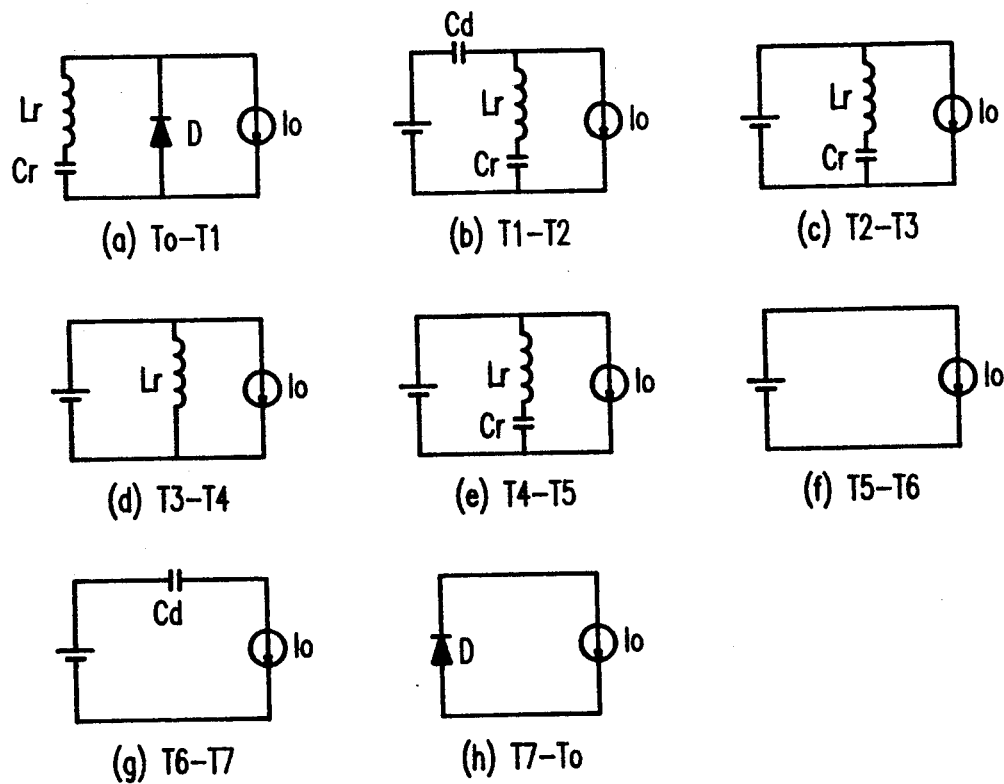
FIGS. 7a through 7h show equivalent circuits for different operating stages of the circuits shown in FIG. 6.
Figure 6:
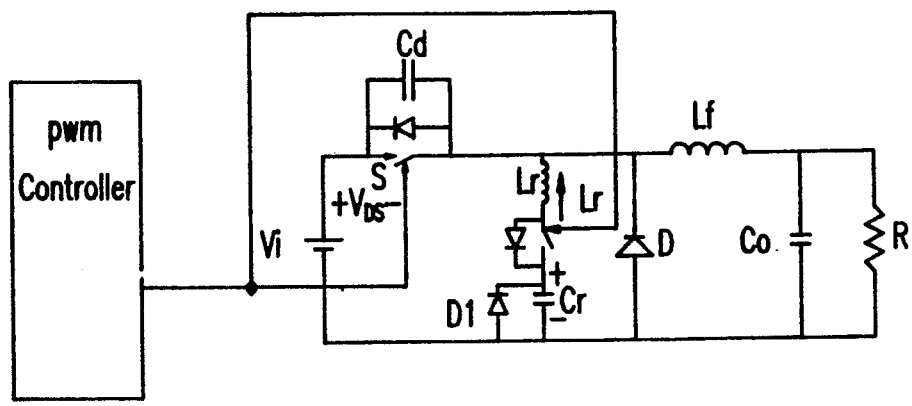
FIG. 6 is a circuit diagram, similar to FIGS. 1 and 3 of yet another embodiment of the invention; this embodiment shows a circuit diagram and key waveforms of a buck zero-voltage transition pulse-width-modulated converter.
Figure 6:
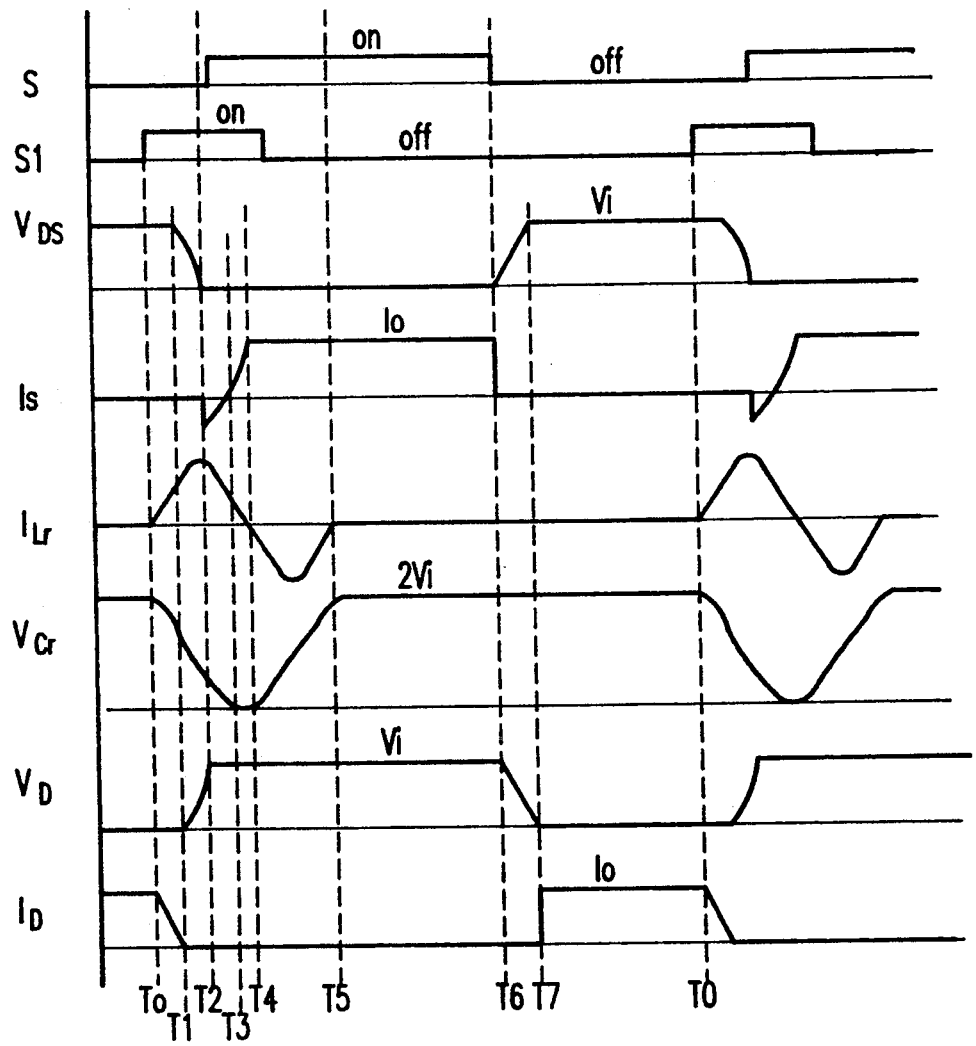

Referring now to FIG. 6, it shows a zero-voltage transition, pulse-width-modulator converter in accordance with an alternate embodiment of the invention; FIG. 6 shows the circuit diagram and the key waveforms. It differs from a prior art buck PWM converter by using a resonant-transition branch consisting of a resonant inductor Lr, a resonant capacitor Cr, an auxiliary switch S1, and a clamp diode D1. Cd is the parasitic capacitances of the switches. By applying the capacitor-shift rule, the parasitic capacitance of the rectifier can be removed from across the output capacitance of the power switch. To simplify the analysis, the output filter inductor is considered as a current source. As shown in FIG. 7, eight operation stages exist within one switching cycle:

(a) T0-T1: The auxiliary switch S1 is turned on at T0, and the resonance between Lr and Cr begins. The Lr current increases until it reaches Io at T1, where Cd joins the resonance.

(b) T1-T2: Lr current continues to increase. Cd is discharged until it reaches zero voltage at T2, where the anti-parallel diode of S begins to conduct.

(c) T2-T3: The anti-parallel diode of switch S is on, and switch S is turned on with zero-voltage switching during this time interval. The voltage across the resonant capacitor decreases until it reaches zero, and the clamp diode D1 is on.

(d) T3-T4: Lr current decreases linearly until it reaches zero at T4. Due to the use of the clamp diode D1, the Cr voltage does not go negative.

(e) T4-T5: The anti-parallel diode of S1 is on. Cr is charged in a resonant fashion until it reaches its maximum voltage (2 Vi) at T5.

(f) T5-T6: S1 and D are off during this interval. It corresponds to the inductor-charging stage of the buck PWM converter.

(g) T6-T7: At T6, switch S is turned off with zero-voltage switching. Cd is charged linearly by the filter inductor current (Io) until it reaches Vi at T7, where the diode is turned on.

(h) T7-T0: This interval is identical to the freewheeling stage of the buck PWM converter. At T0, S1 is turned on again, starting another switching cycle.

It can be seen that the voltage and current waveforms of the switches in the new converter are square-like except during the turn-on and turn-off switching intervals where the zero-voltage resonant transition takes place. The zero-voltage-transition time T0-T5 and T6-T7 can be very short with respect to the switching cycle, so the operation of the new converter resembles that of a prior art buck PWM converter during most portions of the cycle. Thus both the active and passive switches are zero-voltage switched and are subjected to minimum voltage and current stresses the same as in its PWM counterpart. In addition, the auxiliary switch S1 only handles small transition energy and operates with zero-current switching. Consequently, the switching losses are significantly reduced at a minimized increase of conduction loss.

Figure 8:
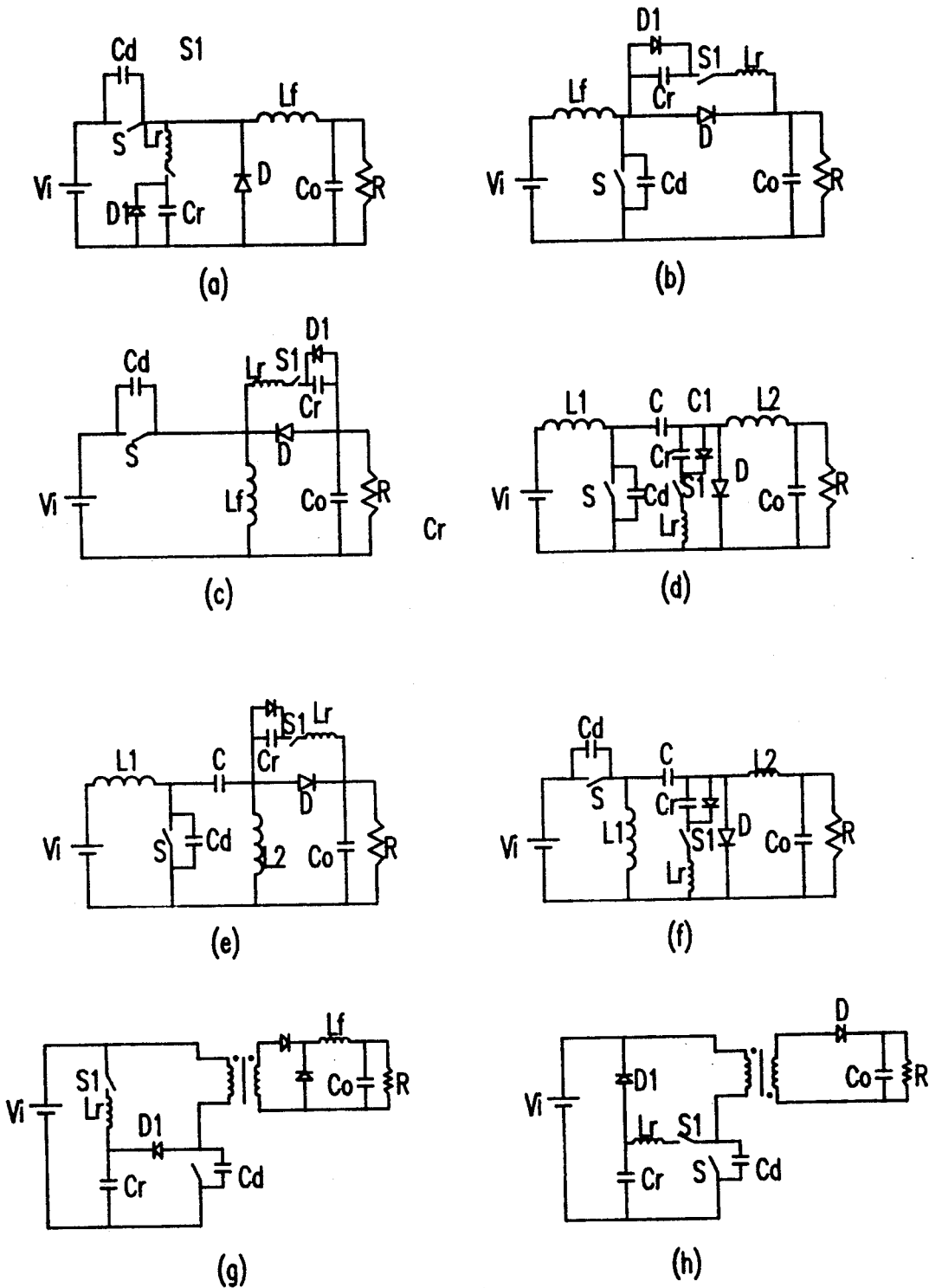
FIGS. 8a through 8h illustrate basic topologies of a zero-voltage transition pulse-width-modulated converter in accordance with this invention.
Figure 9:
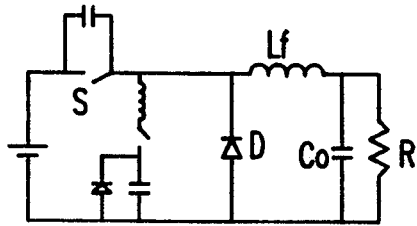
FIG. 9 shows several different topological variations of a buck zero-voltage transition pulse-width-modulator in accordance with the teachings of this invention.
Figure 9:
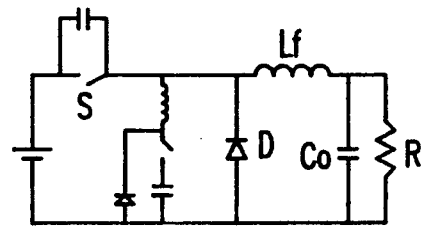
Figure 9:
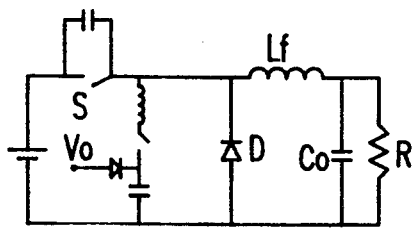
Figure 9:
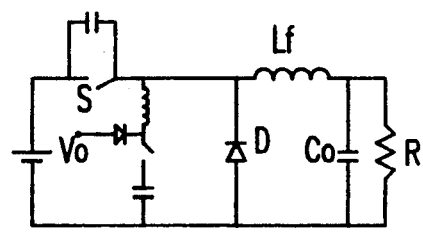
Figure 9:
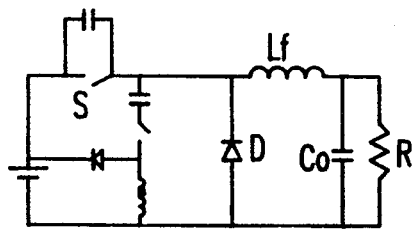
Figure 9:
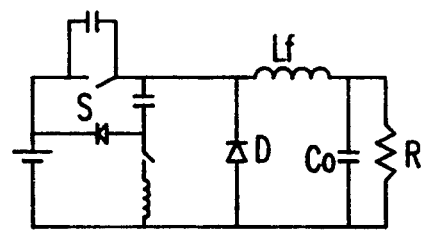

The new concept can be extended to any PWM topologies. Several basic topologies of the embodiment of the invention of the new family of ZVT-PWM converters are shown in FIG. 8. In addition, for each basic ZVT-PWM converter, there exists a number of topology variations. FIG. 9 gives some topology variations of the buck ZVT-PWM converter.

Since the rectifier diode in a ZVT-PWM converter is also zero-voltage switched, the new technique can be well used for high-voltage output applications (e.g., power factor correction circuits), where the rectifier suffers from severe reverse recovery problem when traditional PWM, ZVS-QRC, or ZVS-PWM technique is employed.

A 500 kHz, 100 W buck ZVT-PWM converter has been implemented to demonstrate the operation of the new converters.

Figure 10:
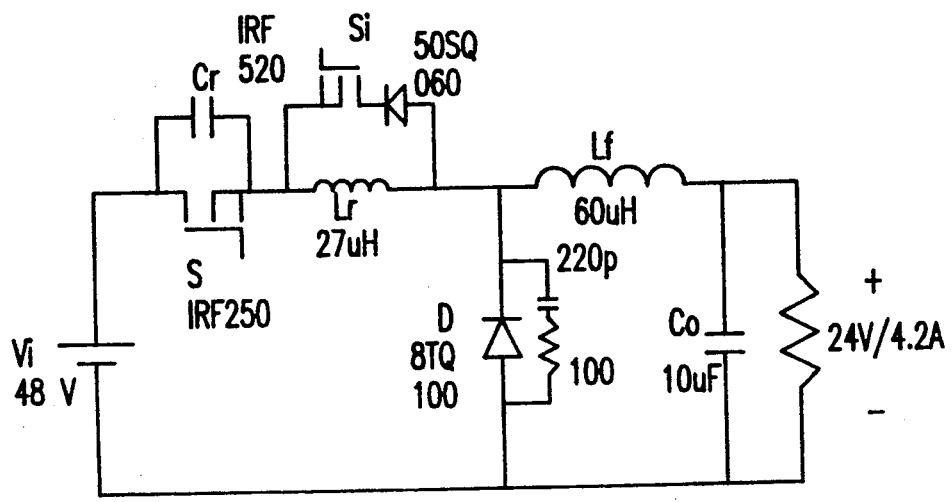
FIG. 10 shows the circuit diagram of a breadboarded converter. The control circuit is implemented by a PWM controller.
Figure 10:
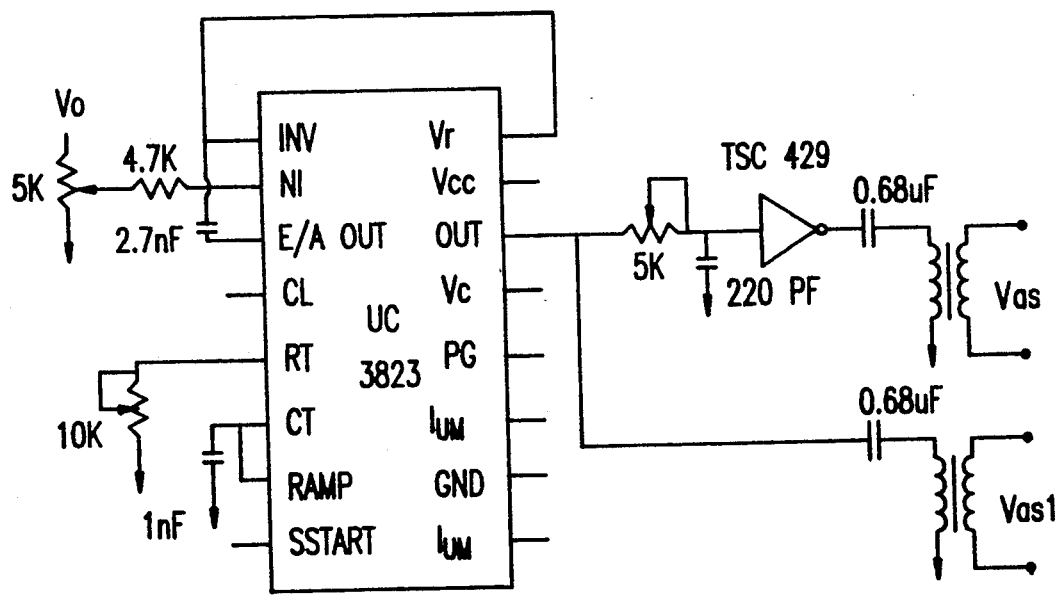

FIG. 10 shows the embodiment of a ZVS-PWM converter which regulates at 24 V output with a 48 V input. The FET output capacitance ($C_{OSS}=650_pF$ at $V_{ds}=25$ V) is used as the resonant capacitor (Cr). The control circuit is implemented by a PWM controller, UC 3823. The converter is designed to ensure ZVS operation above 50% load; thus, the maximum voltage stress of the power switch approximately triples the input voltage.

While the invention has been described in terms of a single preferred embodiment, those skilled in the art will recognize that the invention can be practiced with modification within the spirit and scope of the appended claims.

Having thus described our invention, what we claim as new and desired to secure by Letters Patent is as follows:

1. A pulse-width-modulated, d.c. to d.c. converter comprising in combination:
   a d.c. voltage input means;
   a d.c. voltage output means;
   a pulse-width-modulating switch connected between said d.c. voltage input means and said d.c. voltage output means;
   a resonant circuit comprised of a capacitance connected in parallel across said pulse-width-modulating switch and an inductor connected to a node that is common to said capacitance and to a terminal of said pulse-width-modulating switch;
   an auxiliary switch connected in parallel with said inductor to provide low impedance path across said inductor in the on state of said auxiliary switch;
   a pulse-width-modulating signal source with means connecting said signal source to said pulse-width-modulating switch, and means connecting said signal source to said auxiliary switch;
   said pulse-width-modulating signal source switching said pulse-width-modulating switch between an on state and an off state at a fixed frequency and a varying duty cycle;
   said pulse-width-modulating signal source switching said auxiliary switch between an on state and an off state;
   said auxiliary switch being switched to an off state prior to said pulse-width-modulating switch being switched to an on state so that said auxiliary switch is in said off state a sufficient interval that said resonant circuit establishes a substantially zero voltage across said pulse-width-modulating switch when said pulse-width-modulating switch switches to an on state and said auxiliary switch being switched back to an on state for an interval after said pulse-width-modulating switch switches to an on state in order to control the resonance of said inductor, whereby the pulse-width-modulating switch operates at a constant frequency and zero voltage switching over wide load range.

2. A pulse-width-modulated, d.c. to d.c. converter comprising in combination:
   a d.c. voltage input means;
   a d.c. voltage output means including an output filter and a rectifier diode;
   a pulse-width-modulating switch connected between said d.c. voltage input means and said d.c. voltage output means;
   a resonant circuit comprised of a series connected capacitor, inductor and auxiliary switch with a diode clamp connected across said capacitor;
   means connecting a node of said resonant circuit to a terminal of said pulse-width-modulating switch and means connecting said resonant circuit in parallel with said rectifier diode;
   a pulse-width-modulating signal source switching said pulse-width-modulating switch between an on state and an off state at a fixed frequency and a varying duty cycle;
   said pulse-width-modulating signal source switching said auxiliary switch between an on state and an off state;
   said auxiliary switch being switched to an on state prior to said pulse-width-modulating switch being switched to an on state so that said auxiliary switch is in said on state a sufficient interval that said resonant circuit establishes a substantially zero voltage across said pulse-width-modulating switch when said pulse-width-modulating switch switches to an on state and said auxiliary switch being switched back to an off state for an interval after said pulse-width-modulating switch switches to an on state in order to control the resonance of said resonant circuit, whereby the pulse-width-modulating switch operates at a constant frequency with zero voltage switching of said pulse-width-modulating switch and said rectifier diode over wide load range.

3. A pulse-width-modulating, quasi-resonant, d.c. to d.c. converter as in claim 1, wherein said inductor is a saturable reactor.

* * * * *